United States Patent
Chen et al.

(10) Patent No.: US 7,304,840 B2
(45) Date of Patent: Dec. 4, 2007

(54) MOUNTING APPARATUS FOR DATA STORAGE DEVICES

(75) Inventors: Yun Lung Chen, Tu-Chen (TW); Hui Li, Shenzhen (CN)

(73) Assignees: Hong Fu Jin Precision Indusrty (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 422 days.

(21) Appl. No.: 10/997,112

(22) Filed: Nov. 24, 2004

(65) Prior Publication Data
US 2005/0201052 A1  Sep. 15, 2005

(30) Foreign Application Priority Data
Mar. 9, 2004  (TW) .................................. 93203511

(51) Int. Cl.
*H05K 5/00* (2006.01)
*A47B 81/00* (2006.01)
*B65D 6/00* (2006.01)
*G11B 33/02* (2006.01)

(52) U.S. Cl. ............... 361/685; 361/726; 361/727; 312/223.1; 312/223.2; 220/4.31; 220/4.32; 720/657

(58) Field of Classification Search ............ 361/685, 361/724–727; 312/223.1, 223.2; 220/4.31, 220/4.32; 720/601, 652, 657
See application file for complete search history.

(56) References Cited

U.S. PATENT DOCUMENTS

| | | | | |
|---|---|---|---|---|
| 5,319,519 A | * | 6/1994 | Sheppard et al. | 361/685 |
| 5,801,920 A | * | 9/1998 | Lee | 361/685 |
| 5,825,616 A | * | 10/1998 | Howell et al. | 361/684 |
| 6,930,247 B2 | * | 8/2005 | Chen et al. | 174/50 |
| 6,930,249 B2 | * | 8/2005 | Chen et al. | 174/50 |
| 7,035,099 B2 | * | 4/2006 | Wu | 361/685 |
| 2004/0184231 A1 | * | 9/2004 | Chen | 361/685 |
| 2005/0133237 A1 | * | 6/2005 | Chen et al. | 174/52.1 |
| 2005/0133239 A1 | * | 6/2005 | Chen et al. | 174/52.1 |
| 2005/0201052 A1 | * | 9/2005 | Chen et al. | 361/685 |
| 2005/0243507 A1 | * | 11/2005 | Lambert et al. | 361/685 |
| 2006/0245160 A1 | * | 11/2006 | Zhang et al. | 361/685 |
| 2006/0279925 A1 | * | 12/2006 | Shi et al. | 361/685 |
| 2006/0291159 A1 | * | 12/2006 | Jiang et al. | 361/685 |
| 2007/0019377 A1 | * | 1/2007 | Chen et al. | 361/685 |

FOREIGN PATENT DOCUMENTS

| | | |
|---|---|---|
| TW | 285393 | 4/1992 |
| TW | 190919 | 9/1992 |
| TW | 224797 | 6/1994 |

* cited by examiner

Primary Examiner—Jayprakash Gandhi
Assistant Examiner—Zachary M Pape
(74) Attorney, Agent, or Firm—Wei Te Chung

(57) ABSTRACT

A mounting apparatus includes a chassis (10), a fixing member (50) and a drive bracket (70). The chassis includes a front panel (13) defining an opening (12) and a through hole (19) therein. The fixing member includes a main body (51) mounted to the chassis. The main body includes a fixing part (63) formed upwardly therefrom, an operation part (65) extending forwardly, and an elastic hook (53) extending rearwardly therefrom. The drive bracket includes a mounting wall (73 or 71). The mounting wall comprises a stop (77) formed downwardly therefrom and an aperture (75). In assembly, the operation part of the fixing member extends through the through hole of the front panel. The drive bracket slides in the chassis from the opening thereof. The hook of the fixing member is received in the aperture of the drive bracket. The fixing part of the fixing member engages with the stop of the drive bracket.

20 Claims, 4 Drawing Sheets

MOUNTING APPARATUS FOR DATA STORAGE DEVICES

BACKGROUND OF THE INVENTION

1. Field of the Invention

The present invention relates to mounting apparatuses, and particularly to a mounting apparatus which readily secures data storage devices therein and allows convenient removal of the data storage devices therefrom. The invention relates to the copending application Ser. No. 10/946,739 filed Sep. 21, 2004.

2. Description of the Related Art

In the enclosure of a typical personal computer, there are generally two disk drive brackets mounted therein. Usually, a variety of disk drives are received in the disk drive brackets, which are then secured into the enclosure. There are many ways to secure the disk drive brackets in the enclosure. One way is by using screws. A pair of joining edges is formed on opposite sides of a bottom of a lower disk drive bracket. Fixing holes are defined in the joining edges. The lower disk drive bracket is secured to a bottom of an upper disk drive bracket by screws. However, this way of securing the disk drive brackets is unduly painstaking and time-consuming. Disassembly of the disk drive brackets is similarly painstaking and time-consuming.

Another way to secure the disk drive brackets in the enclosure is by using hooks. An example of a pertinent mounting apparatus for disk drive devices is disclosed in Taiwan patent application No. 81205427. One side of a first disk drive bracket has a plurality of L-shaped flanges and a plurality of L-shaped projections. A corresponding side of a second disk drive bracket has a plurality of L-shaped projections and a plurality of L-shaped flanges, respectively corresponding to the L-shaped flanges and L-shaped projections of the first disk drive bracket. Each flange fastens to the corresponding projection. Thus the second disk drive bracket is secured to the first disk drive bracket. This mounting apparatus does not need screws. However, the disk drive brackets must be assembled by hand inside the computer enclosure. Thus makes the assembly operation inconvenient, and increases the risk of accidental damage to other components such as sensitive electronic components inside the computer enclosure.

Thus an improved mounting apparatus which overcomes the above-mentioned problems is desired.

SUMMARY OF THE INVENTION

Accordingly, an object of the present invention is to provide a mounting apparatus which readily secures data storages devices therein and allows convenient removal of the data storage devices therefrom.

To achieve the above-mentioned object, a mounting apparatus comprises a chassis, a fixing member and a drive bracket. The chassis comprises a front panel defining an opening and a through hole adjacent to the opening therein. The fixing member comprises a main body mounted to the chassis. The main body comprises a fixing part formed upwardly at a front portion, an operation part extending forwardly corresponding to the through hole, and an elastic hook extending rearwardly therefrom at a rear portion. The drive bracket holding a plurality of data storage devices comprises a mounting wall. The mounting wall comprises a stop formed downwardly thereon at a front portion and an aperture defined therein at a rear portion. In assembly, the operation part of the fixing member extends through the through hole of the front panel. The drive bracket slides in the chassis from the opening thereof. The hook of the fixing member is received in the aperture of the drive bracket. The fixing part of the fixing member engages with the stop of the drive bracket. Thus, the data storage devices are secured in the drive bracket.

Other objects, advantages and novel features of the present invention will be drawn from the following detailed description of a preferred embodiment of the present invention with attached drawings. The copending application with the same applicant and the same assignee as the invention, titled "CAGE MOUNTING ASSEMBLY" filed on the same date with the invention is referenced hereto.

DETAILED DESCRIPTION OF THE INVENTION

Figure 1:
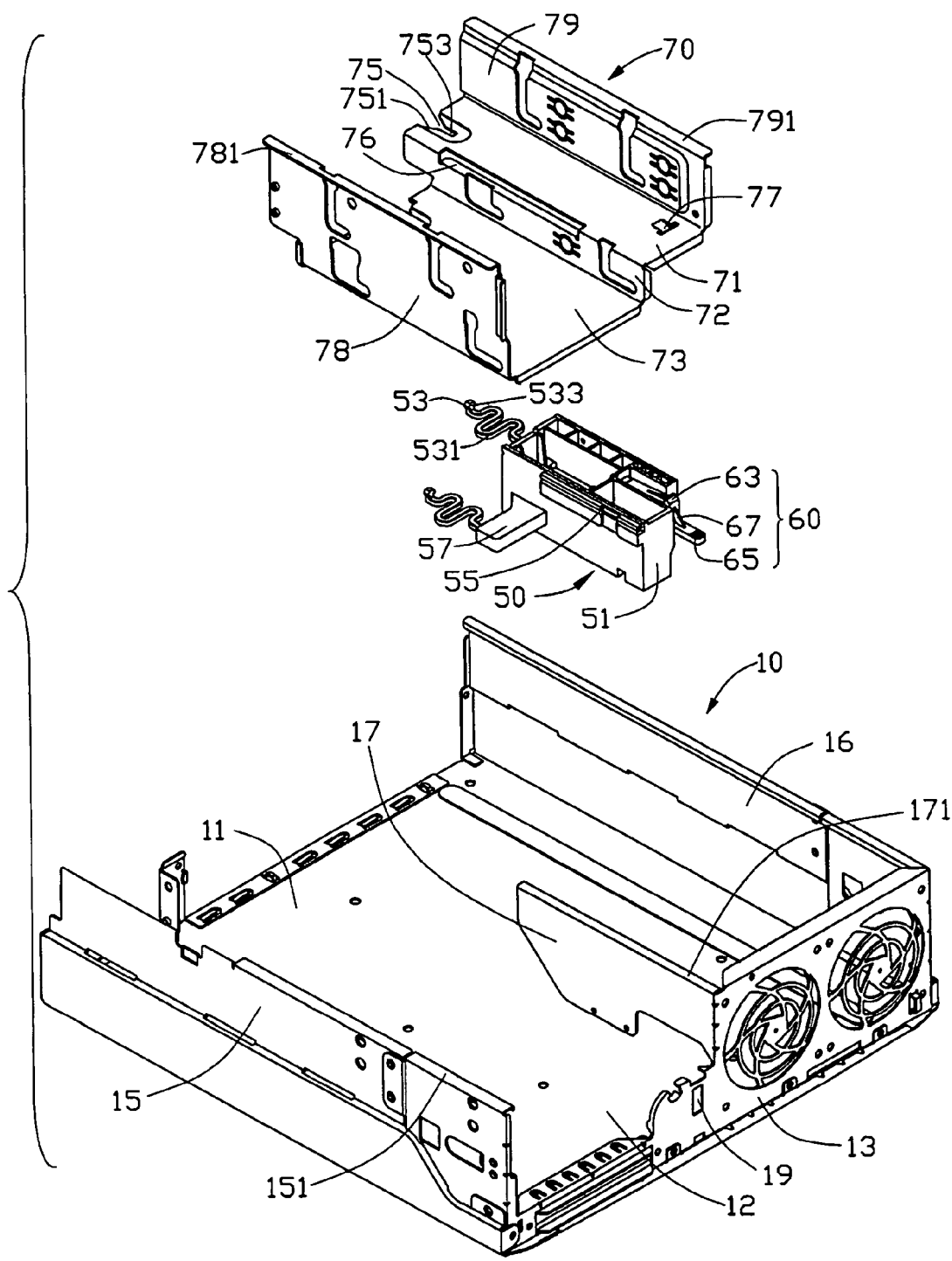
FIG. 1 is an exploded, isometric view of a mounting apparatus in accordance with the preferred embodiment of present invention, the mounting apparatus comprising a chassis, a fixing member and a drive bracket.
Figure 2:
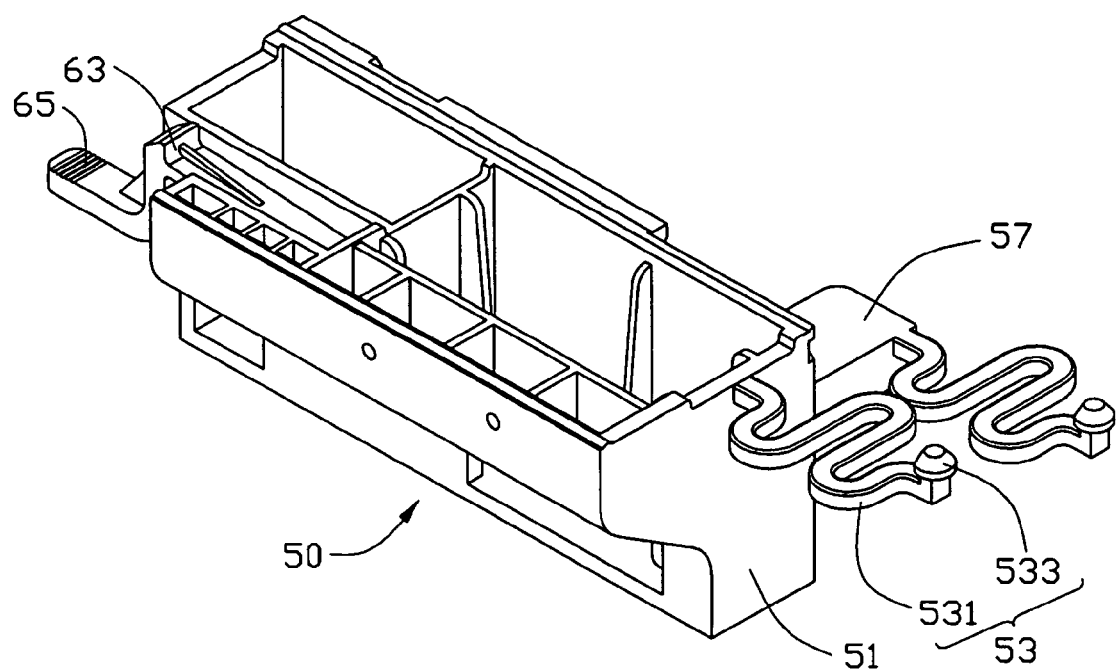
FIG. 2 is an isometric view of the fixing member, but viewed from another aspect.

Referring to FIGS. 1 and 2, a mounting apparatus in accordance with the preferred embodiment of the present invention is used to accommodate a plurality of data storage devices (not shown) therein. The mounting apparatus comprises a chassis 10, a fixing member 50 and a drive bracket 70.

The chassis 10 comprises a bottom panel 11, a front panel 13 extending upwardly from a front edge of the bottom panel 11, a first side panel 15 and a second side panel 16 both extending upwardly from both opposite sides of the bottom panel 11. A flange 151 is bent inwardly from a top of the first side panel 15. The front panel 13 defines an opening 12 therein adjacent to the first side panel 15. A through hole 19 is defined in the front panel 13 adjacent to the opening 12. A support panel 17 is bent perpendicularly rearward from the front panel 13. A flange 171 is bent perpendicularly toward the second side panel 16 from a top of the support panel 17.

The fixing member 50 made of plastic comprises a generally cuboid-shaped main body 51 mounted on the bottom panel 11 of the chassis 10. A block 57 extends outwardly from a side surface of the main body 51. Two hooks 53 extend rearwardly from a rear portion of the main body and the block 57. Each hook 53 comprises a snake-shaped arm 531 and an arrow-shaped clasp 533 protruding upwardly from an end portion of the arm 531. A guiding slot 55 is defined in the side surface of the main body 51. A fixing portion 60 is formed on a front surface of the main body 51. The fixing portion 60 comprises a vertical fixing part 63, a horizontal operation part 65 extending from a bottom of the fixing part 63, and a rib 67 locating between the fixing part 63 and operation part 65 for strengthening the structure thereof.

The drive bracket 70 comprises a first mounting wall 73, a first sidewall 78 and a second sidewall (not labeled) extending upwardly from both opposite sides of the first mounting wall 73. The second sidewall comprises a first vertical wall 72, a horizontal second mounting wall 71 and a second vertical wall 79. A plurality of pairs of mounting slots (not labeled) is defined in the first sidewall 78 and the corresponding first vertical wall 72, second vertical wall 79, for mounting the data storage devices therein. Flanges 781, 791 are bent outwardly from the first sidewall 78 and the second vertical wall 79 at a top. A guiding flange 76 is stamped outwardly from a top end of the first vertical wall 72, corresponding to the guiding slot 55 of the fixing member 50. Two Y-shaped apertures 75 are defined in rear portions of the first mounting wall 73 and second mounting wall 71. Each aperture 75 comprises a guiding portion 751 and a locating portion 753. A stop 77 is stamped downwardly from the second mounting wall 71 at a front portion. The stop 77 has a slanting surface (not labeled). In another embodiment, the stop 77 can be formed on the first mounting wall 73. A locking hole may replace the stop 77.

Figure 3:
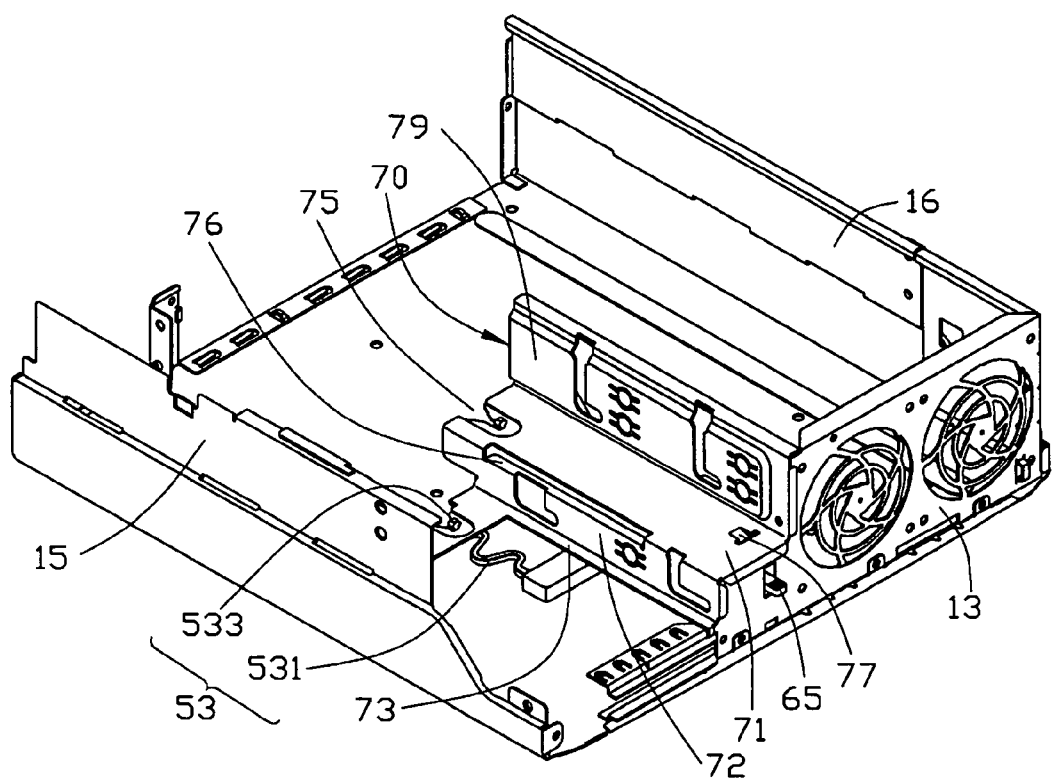
FIG. 3 is an assembled view of FIG. 1, with the drive bracket being partly cut away.

Referring also to FIG. 3, in assembly, the fixing member 50 is secured to the bottom panel 11 of the chassis 10, with the operating part 65 extending through the through hole 19 of the front panel 13 of the chassis 10. The drive bracket 70 is pushed rearward from the opening 12 of the chassis 10, with the guiding flange 76 of the drive bracket 70 sliding in the guiding slot 55 of the fixing member 50, and the flanges 781, 791 of the drive bracket 70 sliding on the flanges 151, 171 of the chassis 10. The clasps 533 of the hooks 53 slide into the apertures 75 of the drive bracket 70 from the guiding portion 751. The clasps 533 slide into the locating portions 753 of the aperture 75s, the fixing part 63 slides along the slanting surface of the stop 77 and engages with the stop 77. The drive bracket 70 is secured to the chassis 10, with the arms 531 of the hooks 53 of the fixing member 50 being stretched elastically. Thus, the data storage devices mounted on the drive bracket 70 is secured to the chassis 10.

Figure 4:
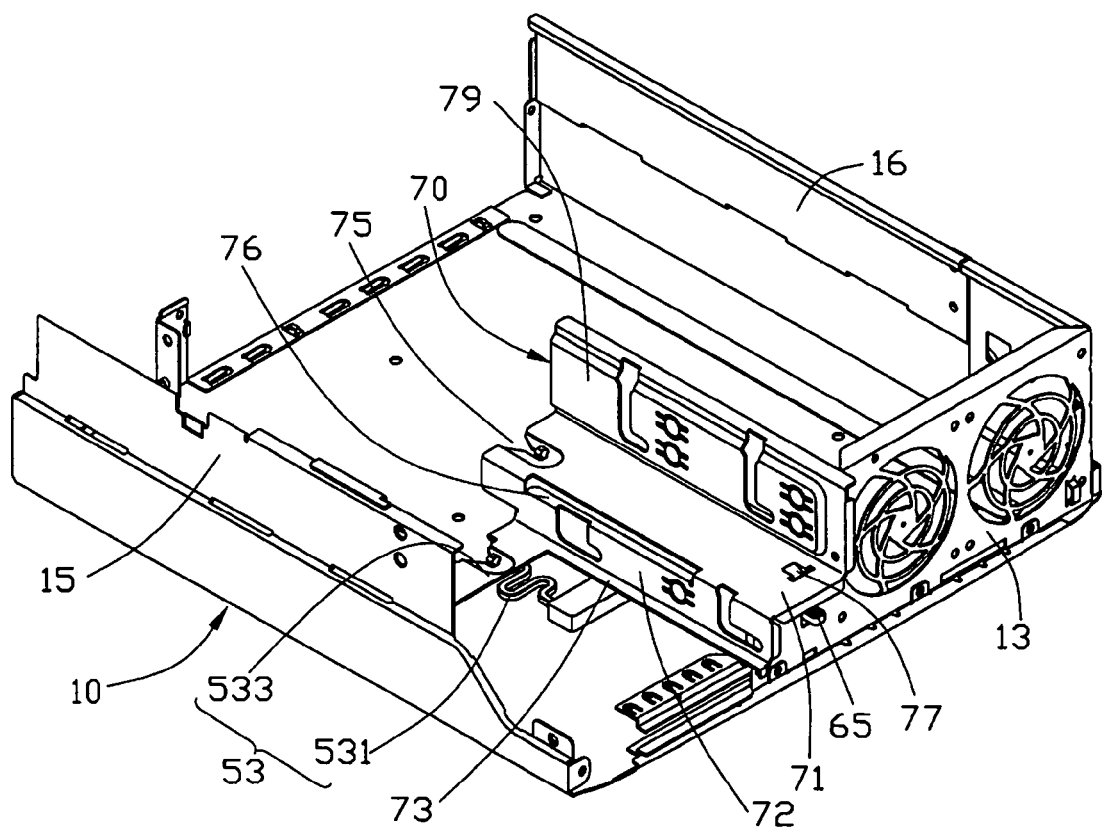
FIG. 4 is similar to FIG. 3, but showing the drive bracket in an unlocked position.

Referring also to FIG. 4, in disassembly, the operation part 65 of the fixing member 50 is pressed downwardly from an outer of the chassis 10. The fixing part 63 of the fixing portion 60 is released from the stop 77. The arms 531 of the hooks 53 move forward to resume elastically. The drive bracket 70 moves forward till the arms 531 resile. Thus, the drive bracket 70 is pulled from the chassis 10.

It is to be understood, however, that even though numerous characteristics and advantages of the present invention have been set fourth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

What is claimed is:

1. A mounting apparatus comprising:
   a chassis comprising a front panel, the front panel defining an opening therein;
   a fixing member comprising a main body mounted to the chassis, the main body comprising a fixing part formed upwardly at a front portion and at least one elastic hook extending rearwardly at a rear portion; and
   a drive bracket comprising at least one mounting wall supported on the main body of the fixing member, said mounting wall comprising a stop formed at a front portion and at least one aperture defined at a rear portion for the elastic hook engaging therein;
   wherein said drive bracket is capable of sliding in the chassis along the fixing member from the opening thereof, thereby diving said hook to be elastically deformed, the fixing part of the fixing member is forced to engage with the stop of the drive bracket by a restoring force of the elastic hook.

2. The mounting apparatus as described in claim 1, wherein the chassis comprises a bottom panel and a side panel extending upwardly from a side of the bottom panel, the side panel is bent inwardly to form a flange.

3. The mounting apparatus as described in claim 2, wherein a support panel is bent inwardly from the front panel of the chassis, the support panel is bent to form a flange corresponding to the flange of the side panel.

4. The mounting apparatus as described in claim 3, wherein the drive bracket comprises a first mounting wall, a first sidewall and a second sidewall extending upwardly from both opposite sides of the first mounting wall, the second sidewall comprises a first vertical wall, a second vertical wall and a second mounting wall connecting the first vertical wall and second vertical wall.

5. The mounting apparatus as described in claim 4, wherein the stop is formed downwardly from the second mounting wall.

6. The mounting apparatus as described in claim 4, wherein two flanges are bent outwardly from the first sidewall and the second vertical wall of the drive bracket.

7. The mounting apparatus as described in claim 4, wherein the first mounting wall and the second mounting wall each defines an aperture, each of the apertures comprises a guiding portion and a locating portion, the main body of the fixing member forms two elastic hooks extending rearwardly from a rear portion thereof, each of the hooks comprises a snake-shaped arm and an arrow-shaped clasp protruding upwardly from the arm.

8. The mounting apparatus as described in claim 4, wherein a guiding slot is defined in a side surface of the fixing member, a guiding flange is stamped outwardly from a top end of the first vertical wall corresponding to the guiding slot.

9. The mounting apparatus as described in claim 1, wherein a through hole is defined in the front panel adjacent to the opening, the fixing member further comprises a horizontal operation part extending from a bottom of the fixing part, corresponding to the through hole of the front panel.

10. A mounting apparatus comprising:
    a chassis comprising a front panel, the front panel defining an opening and a through hole adjacent to the opening therein;
    a fixing member comprising a main body mounted to the chassis, the main body comprising a fixing part formed upwardly at a front portion, an operation part extending forwardly corresponding to the through hole, and at least one elastic hook extending rearwardly therefrom at a rear portion; and
    a drive bracket comprising at least one mounting wall, said at least one mounting wall comprising a stop formed at a front portion and an aperture defined at a rear portion;
    wherein said operation part of the fixing member extends through the through hole of the front panel, said drive bracket slides in the chassis from the opening thereof, said at least one hook of the fixing member is received in said aperture of the at least one mounting wall, the fixing part of the fixing member engages with the stop of the drive bracket, the data storage devices are thereby secured in the drive bracket.

11. The mounting apparatus as described in claim 10, wherein the chassis comprises a bottom panel and a side panel extending upwardly from a side of the bottom panel, the side panel bends inwardly to form a flange.

12. The mounting apparatus as described in claim 11, wherein a support panel is bent inwardly from the front panel of the chassis, the support panel bends to form a flange corresponding to the flange of the side panel.

13. The mounting apparatus as described in claim 12, wherein the drive bracket comprises a first mounting wall, a first sidewall and a second sidewall extending upwardly from both opposite sides of the first mounting wall, the second sidewall comprises a first vertical wall, a second vertical wall and a second mounting wall connecting the first vertical wall and second vertical wall.

14. The mounting apparatus as described in claim 13, wherein the stop is formed downwardly from the second mounting wall.

15. The mounting apparatus as described in claim 13, wherein two flanges are bent outwardly from the first sidewall and the second vertical, wall of the drive bracket.

16. The mounting apparatus as described in claim 13, wherein the aperture of each of the first mounting wall and the second mounting wall comprises a guiding portion and a locating portion, the main body of fixing member forms two elastic hooks extending rearward from a rear portion thereof, each of the hooks comprises a snake-shaped arm and an arrow-shaped clasp protruding upwardly from the arm.

17. A computer enclosure comprising:
a chassis comprising a front panel, the front panel defining an opening;
a fixing member mounted to the chassis, the fixing member comprising a fixing part at a front portion, and a resilient member at a rear portion thereof; and
a drive bracket entering the chassis through the opening and slidable in the chassis, the drive bracket comprising a locking means at a front portion thereof, a free end of the resilient member of the fixing member engaging with the drive bracket; wherein
the drive bracket is slid in a first direction to elastically deform the resilient member until the fixing part engages with the locking means; the drive bracket is slid in a second direction opposite to the first direction by restoring force of the resilient member when the fixing part is released from the locking means.

18. The computer enclosure as claimed in claim 17, wherein the locking means comprises a stop which extends downwardly from the front portion of the drive bracket.

19. The computer enclosure as claimed in claim 17, wherein a slot is defined in a rear portion of the drive bracket, the resilient member has a clasp formed at its free end to engage in the slot of the drive bracket.

20. The computer enclosure as claimed in claim 17, wherein the front panel defines a through hole, the fixing member further comprises an operating part connecting the fixing part, the operating part extends through the through hole for facilitating manual operation.

* * * * *